United States Patent
Doerre et al.

(10) Patent No.: US 8,661,245 B1
(45) Date of Patent: Feb. 25, 2014

(54) SYSTEMS AND METHODS FOR EMPOWERING IP PRACTITIONERS

(75) Inventors: Jeremy Cooper Doerre, Charlotte, NC (US); Chad Dustin Tillman, Charlotte, NC (US)

(73) Assignee: Nimvia, LLC, Charlotte, NC (US)

( * ) Notice: Subject to any disclaimer, the term of this patent is extended or adjusted under 35 U.S.C. 154(b) by 591 days.

(21) Appl. No.: 12/891,782

(22) Filed: Sep. 27, 2010

Related U.S. Application Data

(60) Provisional application No. 61/246,083, filed on Sep. 25, 2009.

(51) Int. Cl.
| | |
|---|---|
| *H04L 29/06* | (2006.01) |
| *G06F 15/16* | (2006.01) |
| *G06Q 50/00* | (2012.01) |
| *G06F 17/30* | (2006.01) |

(52) U.S. Cl.
USPC ............ 713/156; 709/228; 705/310; 707/822

(58) Field of Classification Search
USPC ............ 713/156; 709/228; 705/310; 707/822
See application file for complete search history.

(56) References Cited

U.S. PATENT DOCUMENTS

| | | | |
|---|---|---|---|
| 6,789,092 | B1 | 9/2004 | Oppedahl |
| 7,895,104 | B1 | 2/2011 | Lee |
| 8,078,545 | B1 | 12/2011 | Zilka |

OTHER PUBLICATIONS

USPTO, Private PAIR, Sep. 22, 2008 or earlier, http://www.uspto.gov/patents/process/status/private_pair/index.jsp.*
USPTO, XML Download, Aug. 2007, http://www.uspto.gov/patents/process/status/private_pair/xmldownload-v2_09_07_07.pdf.*
USPTO, PCT Search, Aug. 2007, http://www.uspto.gov/patents/process/status/private_pair/pctsearch-v2_09_07_07.pdf.*
USPTO, Getting Started in Private PAIR 7.1, Aug. 2007, http://www.uspto.gov/ebc/portal/pair/privpair-overview-v3_09_07_07.pdf.*
Macro-Expert, Feb. 2, 2009, http://www.macro-expert.com.*
Mark Reichel, So . . . What Does It All Really Mean, Sep. 17, 2008, http://dailydoseofip.blogspot.com/2008/09/so-what-does-it-all-really-mean.html.*
Veign, Create a one-time popup using jQuery, May 22, 2008, www.veign.com/blog/2008/05/22/create-a-one-time-popup-using-jquery.*
Mahesh Chand, Building Reports from XML Documents using ReportViewer, Apr. 19, 2007, http://www.c-sharpcorner.com/UploadFile/mahesh/XmlReports04182007115639AM/XmlReports.aspx.*

\* cited by examiner

*Primary Examiner* — Andrew L Nalven
*Assistant Examiner* — Khang Do
(74) *Attorney, Agent, or Firm* — Tillman Wright, PLLC; Chad D. Tillman; Jeremy C. Doerre

(57) ABSTRACT

A browser application has at least two web browser objects for browsing Private PAIR while hiding multi-page navigation from a user. The browser application is configured to automatically download XML data from Private PAIR, and generate one or more reports therefrom, including a Daily Updates report, a Cross Checker report, and a Docket Listing report. The browser application is preferably configured to selectively provide limited access to Private PAIR by restricting user navigation to programmatic navigation.

20 Claims, 2 Drawing Sheets

SYSTEMS AND METHODS FOR EMPOWERING IP PRACTITIONERS

CROSS-REFERENCE TO RELATED APPLICATION

The present application is a U.S. nonprovisional patent application of, and claims priority under 35 U.S.C. §119(e) to, U.S. provisional patent application Ser. No. 61/246,083, filed Sep. 25, 2009, which provisional patent application is hereby incorporated herein by reference. The present application also hereby incorporates herein by reference Appendix A, attached hereto.

COPYRIGHT STATEMENT

All of the material in this patent document, including the computer program listing, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

COMPUTER PROGRAM LISTING

Submitted concurrently herewith via the USPTO's electronic filing system, and incorporated herein by reference, are computer program files including instructions, routines, and/or other contents of several computer program. A table setting forth the name and size of each file included in the computer program listing is included below.

| File Name | Creation Date | Size in Bytes | Description |
| --- | --- | --- | --- |
| readme.txt | 9/27/2010-3:34 PM | 2,873 | Instructions |
| ascify.txt | 9/27/2010-3:50 PM | 37,473 | assembly source code |
| access0.txt | 9/27/2010-1:34 PM | 7,570,823 | PAIR Access Base Folder |
| access1.txt | 9/27/2010-1:35 PM | 19,667,506 | PAIR Access Subfolder(s) |
| access2.txt | 9/27/2010-1:35 PM | 18,626,773 | PAIR Access Subfolder(s) |
| access3.txt | 9/27/2010-1:35 PM | 22,779,941 | PAIR Access Subfolder(s) |
| access4.txt | 9/27/2010-1:36 PM | 23,838,300 | PAIR Access Subfolder(s) |
| inine0.txt | 9/27/2010-1:53 PM | 22,623,687 | Insight 2k9 Base Folder |
| inine1.txt | 9/27/2010-1:54 PM | 8,006,867 | Insight 2k9 Subfolder(s) |

A first of these files, "readme.txt", contains instructions for utilizing a second of the files "ascify.txt" to extract information from the remaining files. These remaining files are compressed binary files that have been converted to ascii format. These files can be converted back to binary format utilizing a assembly conversion program source code for which is contained in "ascify.txt". The readme file includes instructions for compiling and running this conversion program, as well as instructions for converting the other text files to compressed, binary files. The compressed, binary files include source code written in C Sharp that can be compiled utilizing Microsoft Visual Studio 2008. The target environment for this implementation is 32-bit Windows XP, Vista, or 7.

BACKGROUND OF THE INVENTION

The present invention generally relates to software for facilitating access to U.S. patent data. A need exists for improvement in patent data browsing and display. This, and other needs, are addressed by one or more aspects of the present invention.

SUMMARY OF THE INVENTION

The present invention includes many aspects and features. Moreover, while many aspects and features relate to, and are described in, the context of Private PAIR browsing, the present invention is not limited to use only in Private PAIR browsing, as will become apparent from the following summaries and detailed descriptions of aspects, features, and one or more embodiments of the present invention.

Accordingly, one aspect of the present invention relates to a method for providing access to Private PAIR to a user. The method includes steps of displaying, via a monitor, a graphical user interface element prompting a user to identify, via one or more peripheral devices, a location of a security certificate for use in logging in to Private PAIR; displaying, via a monitor, a graphical user interface element prompting a user to input, via one or more peripheral devices, a password associated with the security certificate for use in logging in to Private PAIR; storing, in a computer readable medium at a computing device under control of the user, the location of the security certificate for use in logging in to Private PAIR, an identification of the location having been input by a user via one or more peripheral devices; storing, in a computer readable medium at a computing device under control of the user, the password associated with the security certificate for use in logging in to Private PAIR, the password having been input by a user via one or more peripheral devices; upon launching of an application, effecting navigation to a login page for Private PAIR; automatically effecting login to Private PAIR, said automatically effecting login including inputting, via the login page, the location of the security certificate and the password associated with the security certificate; and displaying, to a user via a monitor, a Private PAIR page.

In a feature of this aspect, the method further includes receiving, from a user via a program user interface, a navigation request; and effecting navigation to fulfill the navigation request.

In a feature of this aspect, the method further includes the step of displaying, via a monitor, a graphical user interface element prompting a user to acknowledge, via one or more peripheral devices, export control regulations.

In a feature of this aspect, the method further includes, prior to said steps of storing the location and password, a step of confirming that the export control regulations were acknowledged.

In a feature of this aspect, the security certificate is a PKI certificate.

Another aspect of the present invention relates to a computer readable medium containing computer executable instructions for carrying out a method in accordance with the first aspect.

A third aspect of the present invention relates to a method. The method includes displaying, to a user via a monitor, a first web page via a first browser; receiving, from the user via a program user interface, a navigation request; effecting navigation, based on the received user navigation request, utilizing a second browser, the second browser not being visible to the user; determining that navigation based on the received user navigation request is completed; and displaying, to the user via the monitor, web content via the second browser, wherein, upon such displaying, the first browser is no longer visible to the user.

In a feature of this aspect, the first web page is a first Private PAIR web page, and wherein the received navigation request is a request to navigate to a second Private PAIR web page. In accordance with this feature, in at least some implementations, the received navigation request includes an application number input by the user via the program user interface, and wherein the second Private PAIR web page includes data associated with that application number, and further comprising a step of determining that a text string input by the user is an application number. Further, in accordance with this feature, in a sub-feature, in at least some implementations, the received navigation request includes an attorney docket number input by the user via the program user interface, and wherein the second Private PAIR web page includes data associated with that attorney docket number, and further comprising a step of determining that a text string input by the user is an attorney docket number. Still further, in accordance with this sub-feature, in at least some implementations, the step of determining that a text string input by the user is an attorney docket number includes a step of determining that the text string begins with a particular character. Still yet further, in accordance with this feature, in at least some implementations, the received navigation request includes an indication of a Private PAIR tab selected by the user via the program user interface, and wherein the second Private PAIR web page displays that tab. And even still further, in accordance with this feature, in at least some implementations, the method further includes, after a user attempts to navigate Private PAIR via clicking on a link or button on a Private PAIR web page displayed via the first browser, a step of canceling navigation of the first browser to prevent the user from navigating utilizing such link or button.

In a feature of this aspect, the method further includes receiving, from the user via the program user interface, a second navigation request; effecting navigation, based on the received second user navigation request, utilizing the first browser, the first browser not being visible to the user; determining that navigation based on the received user navigation request is completed; and displaying, to the user via the monitor, web content via the second browser.

Another aspect relates to a computer readable medium containing computer executable instructions for carrying out a method in accordance with the third aspect.

A fifth aspect relates to a method. The method includes, upon launching of an application, effecting navigation via a first browser to a login page for Private PAIR; automatically effecting login to Private PAIR, said automatically effecting login including inputting, via the login page, a location of the security certificate and a password associated with the security certificate; displaying, to a user via a monitor, a Private PAIR page via a first browser; effecting navigation, via a second browser that is not visible to the user, to a Private PAIR download page; and automatically downloading, via the Private PAIR data download page, data associated with the security certificate.

In a feature of this aspect, the data associated with the security certificate is data associated with customer numbers associated with the security certificate.

In a feature of this aspect, the data associated with the security certificate is XML data.

In a feature of this aspect, the method further includes steps of generating one or more reports based on automatically downloaded data and displaying one of the one or more reports to a user via a monitor.

Another aspect relates to a computer readable medium containing computer executable instructions for carrying out a method in accordance with the fifth aspect.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
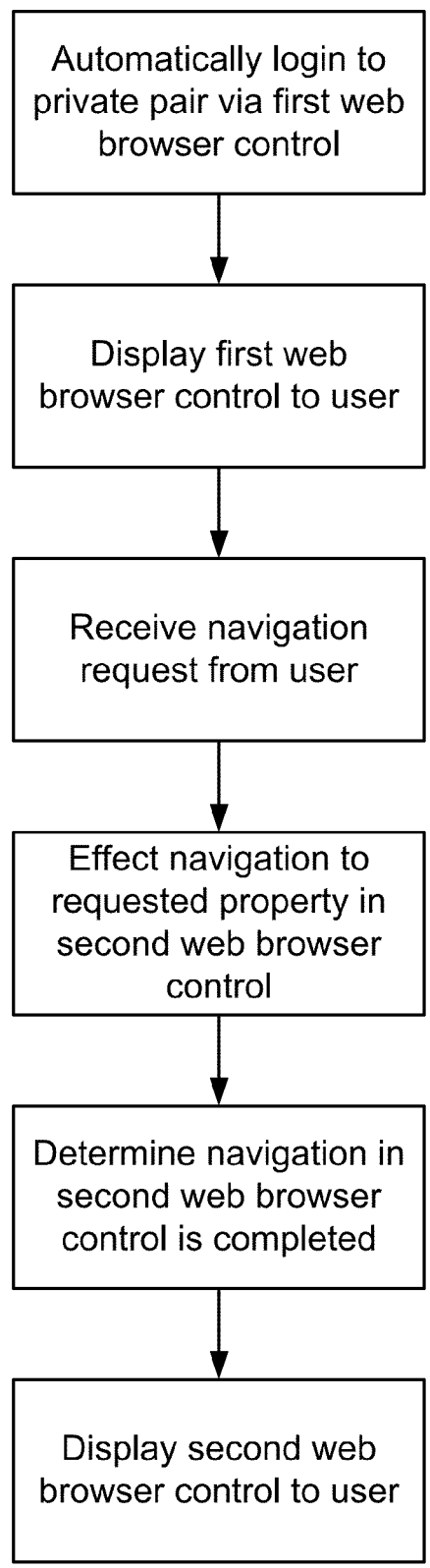
FIG. 1 represents an exemplary process flow illustrating the use of multiple web browser controls for Private PAIR navigation.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

A browser application for use with Private PAIR in accordance with one or more preferred aspects of the present invention enables a user to log in to Private PAIR via a login form. The login form includes several checkboxes representing configuration options described more fully hereinbelow. The login screen also includes digital certificate and password input boxes, as well as an import control checkbox. Clicking in the digital certificate input box enables the user to browse and select such digital certificate via a standard windows browse window. In order to login, a user selects a digital certificate, enters the password associated with that digital certificate, acknowledges displayed import control considerations by checking the appropriate checkbox, and hits a login button to initiate login.

The browser application then effects navigation of a first web browser control to a website address corresponding to Private PAIR, specifically PrivatePAIR_url, which redirects the first web browser control to an authentication page. Once the authentication page is fully loaded, the application automatically populates certificate and password fields of the authentication page, and passes the user's acknowledgement of the import control considerations into the page by checking the appropriate checkbox. The application then effects login, either by clicking the appropriate button, or making an appropriate JavaScript call. In a preferred implementation, the above described process is effected by navigating the web browser control to "javascript: command1; command2; command3;" where command1, command2, and command3 are representative of a series of JavaScript commands which accomplish such task. Additionally, or alternatively, the above described process is effected by obtaining a reference to html elements of a collection of html elements and then appropriately manipulating same. It will be appreciated that the series of JavaScript commands may accomplish this as well.

In a preferred implementation, the browser application includes a text box for entry of an application number, patent number, publication number, or docket number, as well as a drop down menu with menu choices corresponding to Private PAIR tabs. The browser application allows a user to input a number into the text box, and select one of the drop down menu choices to effect navigation to a desired tab.

Upon entry by a user of a number, the program determines what type of number was entered by determining whether it corresponds to a set format for each type of number. In a preferred implementation, a seven digit number is presumed to be a patent number, an eight digit number or a number with a "/" in its third digit is presumed to be an application number, etc. In at least some preferred implementations, a matter number may be indicated by utilizing a control character either before or after the entry. For example, ".1000", "m1000", or "/m1000" might correspond to entry of matter number 1000. Alternatively (or additionally), a radio button or other user interface element might allow a user to select what type of number has been entered.

Following entry of a number and selection of a drop down menu item corresponding to a Private PAIR tab, the browser application clears the input text box, navigates a second web browser control to Private PAIR, automatically inputs the input number, selects the appropriate radio button on the Private PAIR page to indicate what type of number it is (if necessary), submits that page, and then, if necessary, navigates to the appropriate Private PAIR tab via a JavaScript call.

During such navigation, the first web browser control remains visible on top. Once the second web browser control completes navigation to the desired Private PAIR tab for the desired application, the second web browser control is moved to the top so that it is visible to the user. An exemplary process flow in accordance with this process is illustrated in FIG. 1.

If the user then wishes to navigate to another tab of the same application, the user can select the menu item corresponding to that tab in the drop down menu, and navigation will be effected in the displayed web browser control to that tab. If the user wishes to navigate to another tab of a different application and inputs an application number into the input text box and selects a drop down menu item corresponding to a Private PAIR tab, navigation is effected in the first web browser control (which is now not visible to the user because the second web browser control is on top) to the selected tab of the selected application according to the process described above, and, upon completion of such navigation, the first web browser control is once again brought to the front so that it is visible by the user. Such a front and back web browser control methodology allows for multi-page navigation without having to present every page to the user. Preferably, each web browser control has a visible property set to true, but is simply not visible to a user because another web browser control is on top of it.

In one or more preferred implementations, limited access to Private PAIR is provided. In a preferred implementation, a flag is used to determine whether or not full access to Private PAIR is available at any given time. In some preferred implementations, this flag is set or not based on a user's choice, and access can be switched from limited to full via the entry of a password. This password may be the password associated with a user's PKI certificate, or may be a different password.

When only limited access is provided, navigation via webpage buttons and links in Private PAIR is programmatically prevented, for example by canceling navigation when the limited access flag is set unless navigation is itself effected programmatically.

In a preferred implementation, this is accomplished via use of two web browser controls as described hereinabove. Specifically, navigation of a front web browser control that is visible to a user is prevented, while a user's navigation request entered via a program user interface will effect navigation of a back web browser control, which is then brought to the front when navigation is complete. Once this web browser control is brought to the front, further navigation in this web browser control would be blocked, and to effect further navigation the user would need to once again utilize the program's user interface.

This allows for the provision of limited access to Private PAIR, for example allowing an individual to access Private PAIR via a PKI certificate while still ensuring no changes will be made to any data associated with this certificate.

In at least some preferred implementations, however, a user is still able to programmatically navigate to other tabs of a particular application in the same web browser via the program's user interface. For example, in a preferred implementation, this is accomplished by temporarily allowing a limited navigation option in a front window. Similarly, in at least one preferred implementation, restricted access and navigation via a program interface might be provided utilizing only a single web browser control, and simply selectively allowing user interface effected navigation while disallowing all other navigation.

In at least some preferred implementations, upon logging in for the first time, the browser application performs one or more checks to determine whether or not to download Private PAIR data and generate reports therefrom. Preferably, the browser application checks to see whether or not data has been downloaded, or reports have been generated, already that day. Additionally, the browser application preferably checks whether a user has selected that Private PAIR data should be downloaded, and reports updated (as described hereinbelow) every time the browser application first logs in to Private PAIR.

Figure 2:
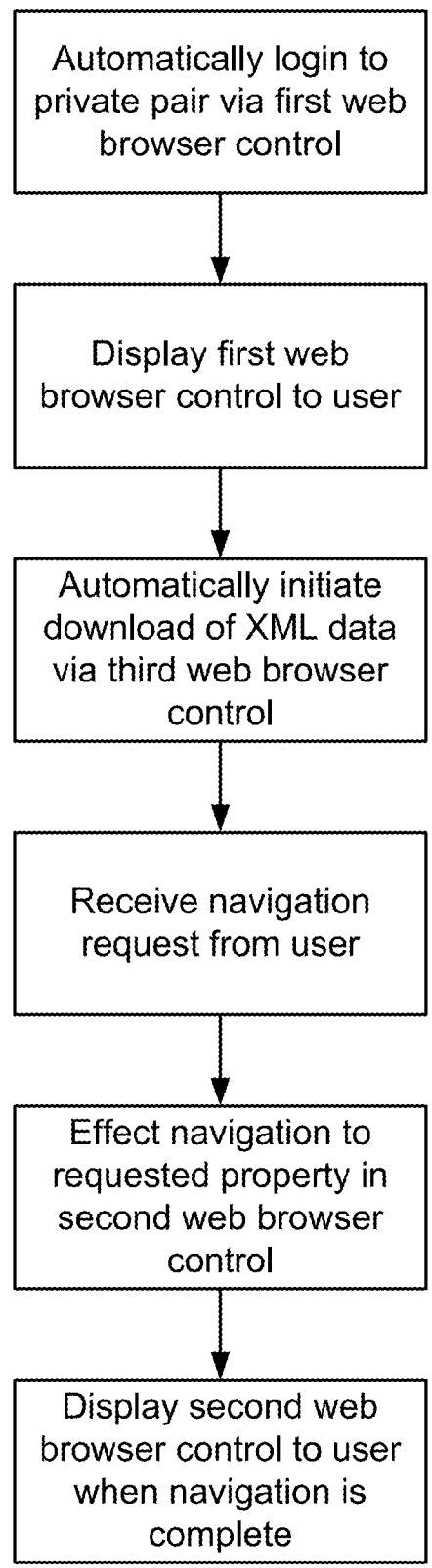
FIG. 2 represents an exemplary process flow illustrating the use of a third web browser control for the automatic downloading of Private PAIR data.

In a preferred implementation, upon a successful login to Private PAIR, a third web browser control below the first and second web browser controls is navigated to Private PAIR, and automatically downloads one or more XML files corresponding to each customer number associated with a user's digital certificate. A process flow illustrating this step is provided in FIG. 2. Navigating and initiating the download is preferably accomplished in a manner similar to that described above, e.g. JavaScript, while a custom download manager is preferably implemented to prevent the display of any window asking a user where to save the downloaded XML files. In a preferred implementation, an extended web browser control, such as, for example, the extended web browser control available at http://code.google.com/p/csexwb2, is utilized to accomplish this.

After the XML files corresponding to each customer number are downloaded, the application data contained in these XML files is combined into a single XML file. This XML file is then utilized to generate a plurality of reports which present the data in a more readable way. Exemplary such reports are displayed in screenshots included in Appendix A attached hereto.

In a preferred implementation, XSLT transforms are utilized to generate each HTML report from the combined XML. Additionally, processing may be performed on the XML data prior to such transforms. For example, an attribute could be added detailing whether or not a particular element should be displayed, or whether it should be highlighted in a particular color.

Alternatively, a reporting tool, such as, for example, Crystal Reports, could be utilized to organize and display XML data. As yet another alternative, the program could generate an HTML page incorporating the XML data without utilizing XSLT transforms. As still yet another alternative, windows forms may be utilized to display data.

In preferred implementations, a Daily Updates report, a Daily Cross Checker report, and a Docket Listing report are generated.

The Daily Updates report displays applications for which a transaction or status update occurred the previous day.

The Daily Cross Checker report displays applications for which a deadline or action might be required on the present day. The browser application includes one or more algorithms to filter such applications by considering the data associated with each application. For example, if an application's status on Sep. 25, 2009 indicates that an Office Action was mailed on Jun. 25, 2009, the report displays that an Office Action was mailed three months ago and a response may be due if it has not already been filed. Notably, if a response had been filed and the status of the case was updated by the USPTO to reflect that a response had been received, then this application would not be displayed.

The Docket Listing report displays a listing of each patent application for which data was downloaded.

In at least some preferred implementations, one or more reports may be generated sorted based on any data contained in the downloaded data. For example, a Docket Listing report may be sorted by Docket No. and only display active cases. Or, a cross checker report may only display cases which have been published. In a preferred implementation, multiple reports of the same type are generated sorted by different values.

Preferably, the browser application further includes a logout button. This logout button effects navigation of a web browser control to a logout URL of Private PAIR, grabs the source for the loaded logout page, and then finds the href target of a logout link, and navigates the web browser control to that link to effect logout of Private PAIR, and then exits.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for providing access over the Internet to Private PAIR to a user of a personal computer, comprising:
   (a) storing authentication information for accessing Private PAIR on the personal computer, including:

(1) displaying to a user, via a computer display screen of the personal computer, a graphical user interface element prompting the user to identify, via one or more peripheral devices, a location of a security certificate for use in logging in to Private PAIR;

(2) displaying to the user, via the computer display screen of the personal computer, a graphical user interface element prompting the user to input, via one or more peripheral devices, a password associated with the security certificate for use in logging in to Private PAIR;

(3) receiving, via the graphical user interface elements, user input representing the location of the security certificate for use in logging in to Private PAIR and representing the password associated with the security certificate for use in logging in to Private PAIR;

(4) storing, in a non-transitory computer readable medium of the personal computer, the user input representing the location of the security certificate for use in logging in to Private PAIR and representing the password associated with the security certificate for use in logging in to Private PAIR; and thereafter (b) loading, at the personal computer, a first web browser and a second web browser, the second web browser being loaded without being displayed on the computer display screen of the personal computer;

(c) using the stored authentication information, performing authentication for accessing Private PAIR on the personal computer by, (1) effecting navigation to a login page for Private PAIR, and (2) automatically effecting login to Private PAIR, said automatically effecting login including inputting, via the login page, the location of the security certificate and the password associated with the security certificate, whereby upon a successful authentication a login session to Private PAIR is established;

(d) based on a successful authentication in said step (c), navigating Private PAIR pages using the first web browser in conjunction with the second web browser by alternating between displaying, via the computer display screen of the personal computer, the first web browser and the second web browser, including hiding the first web browser when the second web browser is displayed, and hiding the second web browser when the first web browser is displayed, such that navigation using a single web browser is simulated on the computer display screen of the personal computer from a user perspective.

2. The method of claim 1, further comprising alternating between displaying the first web browser and the second web browser when navigating between first and second Private PAIR pages, which navigation requires navigating to an intermediate Private PAIR page in order to reach the second Private PAIR page from the first Private PAIR page, such that navigation from the first Private PAIR page directly to the second Private PAIR page is simulated from a user perspective.

3. The method of claim 1, wherein the first web browser comprises a first web browser control, and wherein the second web browser comprises a second web browser control different from the first web browser control, and wherein both the first and second web browser controls are contained within the same application window.

4. The method of claim 3, further comprising loading without displaying on the computer display screen of the personal computer a third web browser control within the same application window; downloading data from Private PAIR for generating a report using the third web browser control; and displaying a user-selectable control within at least one of the first web browser control and the second web browser control by which the report is viewable.

5. The method of claim 1, further comprising receiving user input representing a navigation request, the user input identifying a patent application serial number, and navigating to a Private PAIR page for the patent application.

6. The method of claim 5, wherein the user input further represents an indication of a user-selected Private PAIR tab, and wherein the Private PAIR page to which navigation is effected corresponds to the user-selected Private PAIR tab for the patent application.

7. The method of claim 1, further comprising receiving user input representing a navigation request, the user input identifying an attorney docket number, and navigating to a Private PAIR page for a patent application associated in Private PAIR with the attorney docket number.

8. The method of claim 7, wherein the user input further represents an indication of a user-selected Private PAIR tab, and wherein the Private PAIR page to which navigation is effected corresponds to the user-selected Private PAIR tab for the patent application.

9. The method of claim 1, further comprising receiving user input representing a navigation request, the user input identifying a patent number or patent application publication number, and navigating to a Private PAIR page for a patent application associated in Private PAIR with the identified number.

10. The method of claim 9, wherein the user input further represents an indication of a user-selected Private PAIR tab, and wherein the Private PAIR page to which navigation is effected corresponds to the user-selected Private PAIR tab for the patent application.

11. The method of claim 1, further comprising, after a user attempts to navigate Private PAIR via clicking on a link or button on a Private PAIR page displayed via one of the first and second web browsers, a step of canceling navigation to prevent the user from navigating utilizing such link or button displayed in the web browser.

12. A method for providing access over the Internet to Private PAIR to a user of a personal computer, comprising:

(a) storing authentication information for accessing Private PAIR on the personal computer, including:

(1) displaying to a user, via a computer display screen of the personal computer, a graphical user interface element prompting the user to identify, via one or more peripheral devices, a location of a security certificate for use in logging in to Private PAIR;

(2) displaying to the user, via the computer display screen of the personal computer, a graphical user interface element prompting the user to input, via one or more peripheral devices, a password associated with the security certificate for use in logging in to Private PAIR;

(3) receiving, via the graphical user interface elements, user input representing the location of the security certificate for use in logging in to Private PAIR and representing the password associated with the security certificate for use in logging in to Private PAIR;

(4) storing, in a non-transitory computer readable medium of the personal computer, the user input representing the location of the security certificate for use in logging in to Private PAIR and representing the password associated with the security certificate for use in logging in to Private PAIR; and thereafter (b) loading, at the personal computer, a first web browser and a second web browser, the second web browser being loaded without being displayed on the computer display screen of the personal computer;

(c) using the stored authentication information, performing authentication for accessing Private PAIR on the personal computer by, effecting navigation to a login page for Private PAIR, and automatically effecting login to Private PAIR, said automatically effecting login including inputting, via the login page, the location of the security certificate and the password associated with the security certificate, whereby upon a successful authentication a login session to Private PAIR is established;

(d) based on a successful authentication in said step (c), navigating between first and second Private PAIR pages using the first web browser in conjunction with the second web browser, which navigation requires navigating to an intermediate Private PAIR page in order to reach the second Private PAIR page from the first Private PAIR page, alternating between displaying the first web browser and the second web browser such that navigation from the first Private PAIR page directly to the second Private PAIR page is simulated from a user's perspective on the computer display screen.

13. The method of claim 12, wherein the first web browser comprises a first web browser control; wherein the second web browser comprises a second web browser control different from the first web browser control; and wherein both the first and second web browser controls are contained within the same application window; and further comprising the steps of loading without displaying on the computer display screen of the personal computer a third web browser control; downloading data from Private PAIR for generating a report using the third web browser control; and displaying a user-selectable control within at least one of the first web browser control and the second web browser control by which the report is viewable.

14. The method of claim 12, further comprising receiving user input representing a navigation request, the user input identifying both a patent application and an indication of a user-selected Private PAIR tab; and navigating to a Private PAIR page corresponding to the user-selected Private PAIR tab for the identified patent application.

15. The method of claim 12, further comprising, after a user attempts to navigate Private PAIR via clicking on a link or button on a Private PAIR page displayed via one of the first and second web browsers, a step of canceling navigation to prevent the user from navigating utilizing such link or button displayed in the web browser.

16. A method for providing to a user, on a personal computer, access over the Internet to Private PAIR, comprising the steps of:

(a) loading, at the personal computer, a first web browser and a second web browser, the second web browser being loaded without being displayed on a computer display screen of the personal computer;

(b) performing authentication for accessing Private PAIR on the personal computer by using authentication information comprising a location of a security certificate for use in logging in to Private PAIR and a password associated with the security certificate for use in logging in to Private PAIR including the steps of, (1) effecting navigation to a login page for Private PAIR; and (2) effecting login to Private PAIR; and (c) based on the authentication of said step (b), when navigating from a displayed first Private PAIR page to a second Private PAIR page, (1) displaying the first web browser with the first Private PAIR page, but not displaying the second web browser, and subsequently (2) displaying the second web browser with the second Private PAIR page, but not displaying the first web browser, such that, as displayed, the use of a single web browser by a user is simulated when navigating between the first and second Private PAIR pages.

17. The method of claim 16, wherein navigation between the first Private PAIR page and the second Private PAIR page requires navigating to one or more intermediate Private PAIR pages, and wherein the navigation to the one or more intermediate Private PAIR pages is performed using the hidden browser such that, as displayed, the simulated single web browser appears to navigate from the first Private PAIR page to the second Private PAIR page without navigating to the one or more intermediate Private PAIR pages.

18. The method of claim 16, further comprising intercepting a navigation command and canceling navigation if to a predetermined page having restricted access, whereby limited access to Private PAIR is provided client side on the personal computer.

19. The method of claim 16, wherein the first web browser comprises a first web browser control; wherein the second web browser comprises a second web browser control different from the first web browser control; and wherein both the first and second web browser controls are contained within the same application window; and further comprising the steps of loading without displaying on the computer display screen of the personal computer a third web browser control; downloading data from Private PAIR for generating a report using the third web browser control; and displaying a user-selectable control within at least one of the first web browser control and the second web browser control by which the report is viewable.

20. A method for navigating between first and second Private PAIR pages on a personal computer of a user running an operating system, which navigation requires navigating from the first Private PAIR page to an intermediate Private PAIR page in order to reach the second Private PAIR page, comprising the steps of:

(a) loading, at the personal computer, a first web browser control and a second web browser control, the second web browser control being loaded without being displayed on a computer display screen of the personal computer;

(b) performing authentication for accessing Private PAIR on the personal computer by using authentication information comprising a location of a security certificate for use in logging in to Private PAIR and a password associated with the security certificate for use in logging in to Private PAIR, including the steps of, (1) effecting navigation to a login page for Private PAIR; and (2) effecting login to Private PAIR; and (c) thereafter based on the authentication, (1) using the first web browser control contained within an application window that is displayed on the personal computer for view by the user, displaying in the application window the first web browser control displaying, in turn, the first Private PAIR page;

(2) using the second web browser control that is also contained within the same application window, but which second web browser control is hidden from view by the user on the personal computer, effecting navigation of Private PAIR to the intermediate Private PAIR Page and, subsequent thereto, effecting navigation of Private PAIR to the second Private PAIR page; and (3) displaying on the personal computer within the application window, for view by the user, the second web browser control in which the second Private PAIR page is displayed while the first web browser control is hidden from view of the user within the application window, whereby, as displayed, the use of a single web browser control by a user within the application window is simulated on the personal computer when navigating between the first Private PAIR page and the second Private PAIR page.

* * * * *